United States Patent
Suzuki

(10) Patent No.: US 10,476,814 B2
(45) Date of Patent: Nov. 12, 2019

(54) ARBITER CIRCUIT FOR CROSSBAR

(71) Applicant: Aruba Networks, Inc., Sunnyvale, CA (US)

(72) Inventor: Shiro Suzuki, Roseville, CA (US)

(73) Assignee: Aruba Networks Inc., Houston, TX (US)

(*) Notice: Subject to any disclaimer, the term of this patent is extended or adjusted under 35 U.S.C. 154(b) by 166 days.

(21) Appl. No.: 15/656,492

(22) Filed: Jul. 21, 2017

(65) Prior Publication Data

US 2019/0028408 A1    Jan. 24, 2019

(51) Int. Cl.
*H04L 12/933* (2013.01)
*H04L 12/861* (2013.01)

(52) U.S. Cl.
CPC ........ *H04L 49/101* (2013.01); *H04L 49/1515* (2013.01); *H04L 49/9005* (2013.01)

(58) Field of Classification Search
None
See application file for complete search history.

(56) References Cited

U.S. PATENT DOCUMENTS

| | | | | |
|---|---|---|---|---|
| 4,788,679 A | * | 11/1988 | Kataoka | H04L 49/103 370/388 |
| 5,276,887 A | | 1/1994 | Haynie | |
| 5,689,644 A | * | 11/1997 | Chou | G06F 13/385 370/352 |
| 6,137,838 A | | 10/2000 | Miyagoshi et al. | |
| 6,424,655 B1 | | 7/2002 | Horst | |
| 7,158,510 B1 | | 1/2007 | Golla et al. | |
| 2002/0012340 A1 | * | 1/2002 | Kalkunte | H04L 12/18 370/360 |
| 2003/0107996 A1 | * | 6/2003 | Black | H04L 49/357 370/235 |
| 2005/0047334 A1 | * | 3/2005 | Paul | H04L 12/5601 370/229 |
| 2015/0188848 A1 | * | 7/2015 | Tran | H04L 49/254 370/390 |
| 2015/0295858 A1 | * | 10/2015 | Chrysos | H04L 49/101 370/412 |
| 2018/0159800 A1 | * | 6/2018 | Tietz | H04L 47/52 |

OTHER PUBLICATIONS

Jose G. Delgado-Frias and Girish B. Ratanpal, "A VLSI Wrapped Wave Front Arbiter for Crossbar Switches," 2001, pp. 1-4, University of Virginia, USA, Available at: <eecs.wsu.edu/~jdelgado/papers/glsvlsi2001.pdf>.

* cited by examiner

*Primary Examiner* — Ajit Patel
(74) *Attorney, Agent, or Firm* — Hewlett Packard Enterprise Patent Department

(57) ABSTRACT

An example arbiter circuit for a crossbar may include request circuits corresponding respectively to ingress ports of the crossbar; grant circuits corresponding respectively to egress ports of the crossbar; a request register; and a grant register. Each of the request circuits may be to request a connection between its corresponding ingress port and a target by writing an encoded identifier of the target to the request register. Each of the grant circuits may be to grant a connection between its corresponding egress port and one of the ingress ports by writing an encoded identifier of the ingress port to the grant register.

20 Claims, 8 Drawing Sheets

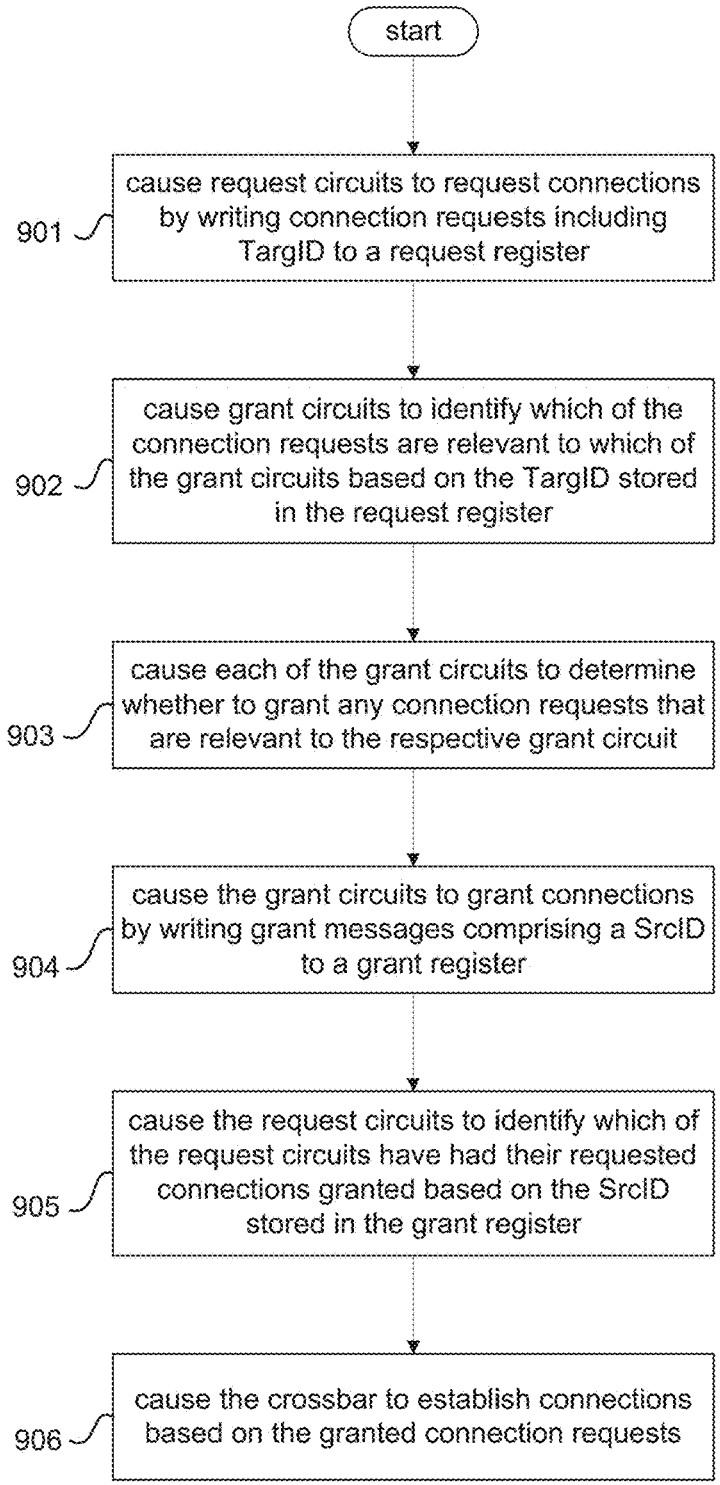

ARBITER CIRCUIT FOR CROSSBAR

BACKGROUND

A crossbar switch (also known as a cross-point switch and a matrix switch) (referred to hereinafter as simply a "crossbar") is a non-blocking switching circuit having a switching fabric comprising multiple ingress ports, multiple egress ports, and an array of switches to connect the ingress ports to the egress ports, in which any of the ingress ports may be connected to any of the egress ports.

BRIEF DESCRIPTION OF THE DRAWINGS

FIG. 9 is a process flow chart illustrating an example process of arbitrating for a crossbar.

DETAILED DESCRIPTION

Figure 1:
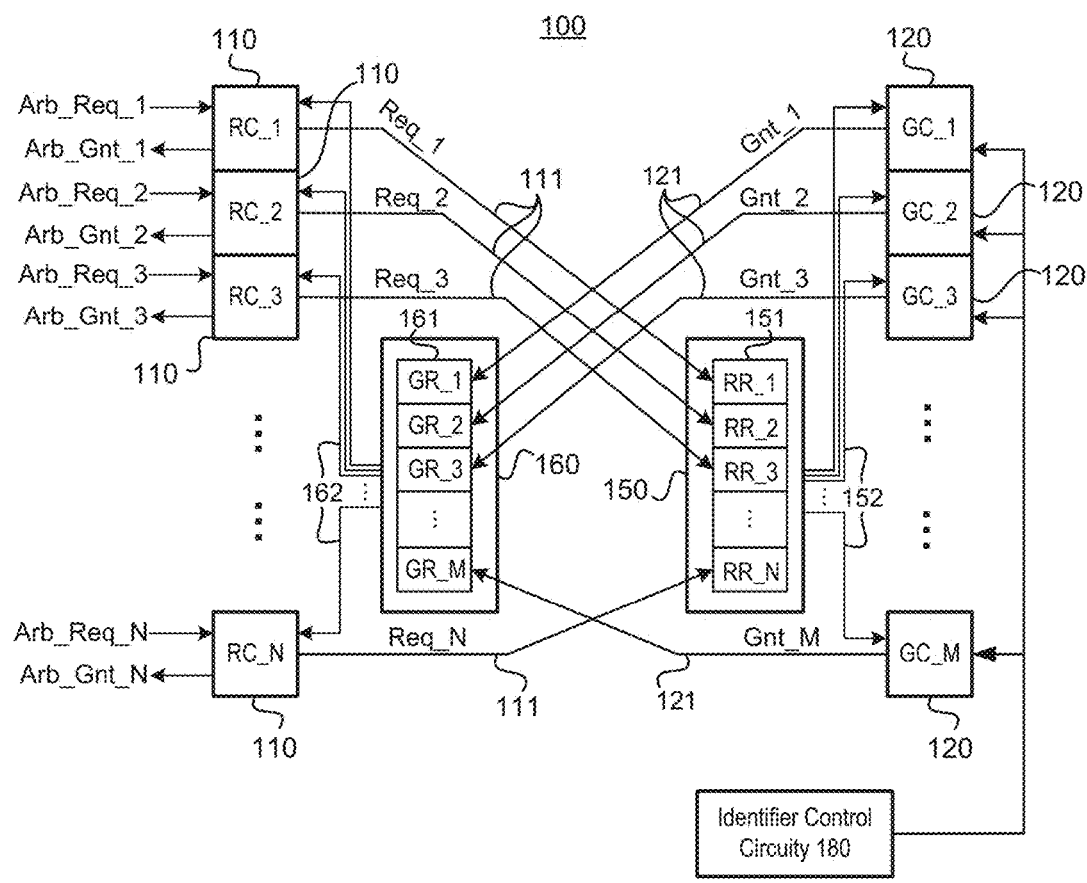
FIG. 1 illustrates an example arbiter circuit.

A crossbar may include an arbiter circuit to arbitrate connection requests between ingress ports and egress ports. For example, the arbiter circuit may receive connection requests from ingress ports, and may determine whether to grant each request and/or determine which egress port should service which ingress port. For example, if more than one ingress port simultaneously requests a connection to the same egress port (an occurrence referred to hereinafter as a "collision"), the arbiter circuit may apply arbitration rules to select which one of the colliding ingress ports is to be granted the requested connection. Furthermore, in some examples the arbiter circuit may not only resolve collisions, but may also select an appropriate egress port for connecting to an ingress port out of multiple possible options.

Switching fabrics of modern crossbars may have fairly large numbers of ports. In particular, recent advances in application-specific-integrated-circuit ("ASIC") fabrication technologies allow more ports to be integrated into ASIC-based switching fabrics than would have been feasible previously. However, in order to implement a crossbar with such high port counts, a large scale arbiter circuit that can arbitrate between such large numbers of ports may need to be provided in addition to such a large scale switching fabric.

It may be difficult to produce such large scale arbiter circuits that are both cost efficient and have desired performance attributes. Thus, the present disclosure describes, among other things, example large scale arbiter circuits for a high port count crossbar, which may be both cost efficient and have high performance. In some of these example arbiter circuits, arbitration request signals comprising encoded target identifiers and arbitration grant signals comprising encoded source identifiers are used to indicate requests/grants between a requesting side of the arbiter circuit and a granting side of the arbiter circuit. In addition, in some examples a desired duration of a requested connection may also be encoded within the arbitration request signals.

For example, an example arbiter circuit may include request circuits corresponding respectively to ingress ports of the crossbar, grant circuits corresponding respectively to egress ports of the crossbar, a request register, and a grant register. A request circuit may request a connection between its ingress port and a target by writing an encoded identifier of the target to the request register. The grant circuits may monitor the request register to detect connection requests. A grant circuit may, in response to detecting a connection request that includes an identifier associated with the grant circuit, decide whether to grant the request, and may grant a connection between its corresponding egress port and the requesting ingress ports by writing an encoded identifier of the requesting ingress port to the grant register. The request circuits may monitor the grant register to detect grant messages. A request circuit may, in response to detecting a grant message that includes the identifier of the request circuit, cause the crossbar to establish the granted connection.

The example arbiter circuits disclosed herein may be able to support very large numbers of ports, without suffering from some of the cost and performance inefficiencies of other approaches. For example, in a first alternative approach to a large scale arbiter circuit, each request circuit has request lines that connect it to each of the grant circuits (i.e., there is a separate request line for each combination of request circuit and grant circuit), such that a request circuit may request a connection to a target egress port by signaling (e.g., pulsing) the request line that is connected between the request circuit and the grant circuit associated with the target egress port. Furthermore, in this approach each grant circuit has grant lines that connect it to each of the request circuits (i.e., there is a separate grant line for each combination of request circuit and grant circuit), such that a grant circuit may grant a connection between its associated egress port and one of the ingress ports by signaling (e.g., pulsing) the grant line that is connected between the grant circuit and the request circuit associated with the selected ingress port. Furthermore, in this approach each request circuit may also have hold lines that connect it to each of the grant circuits (i.e., there is a separate hold line for each combination of request circuit and grant circuit), such that a request circuit may indicate a desired duration of a connection by asserting the hold line that is connected between the request circuit and the grant circuit. Thus, in the first approach, there are N×M×3 signal lines connecting the request side of the arbiter circuit to the grant side of the arbiter circuit (hereinafter "interconnect signal lines"), where N is the number of ingress ports and M is the number of egress ports. As N and M grow large, the number of interconnect signal lines becomes extremely large. For example, if N=M=144, then the number of interconnect signal wires under the first approach would be 144×144×3=62,208. All of these interconnect signal lines are relatively long, because they connect the request side to the grant side of the arbiter circuit. The large number of relatively long interconnect signal lines can greatly increase the cost of the arbiter circuit—in particular, the cost per signal wire for long interconnects in current ASIC technologies can be quite high. For example, in current ASIC technologies, longer interconnects may suffer from signal propagation delays, and thus costly and complex countermeasures may be needed to compensate for the delay, thus driving up the cost per signal wire. Thus, a large scale arbiter circuit according to the first alternative approach may be too expensive to be practical. In addition, in some examples it might not be possible, regardless of the price, to include a large number of long interconnect signal lines within an available area for the arbiter circuit without hurting performance of the arbiter circuit (e.g., lowering a clock frequency).

In contrast, example arbiter circuits disclosed herein may have N×A+M×B long interconnect signal lines, where A and B are the numbers of bits in the request signals and the grant signals, respectively. In general, the number of long interconnect signal wires in example arbiter circuits disclosed herein (N×A+M×B) is much less than—in some cases an order of magnitude or more less than—the number of long interconnect signal wires in the arbiter circuits according to the first approach (N×M×3), especially as N and M become large. For example, if M=N=144 and A=8 and B=7, then the number of long interconnect signal wires in an example arbiter circuit disclosed herein would be 144×8+144×7=2160, which is almost 30 times fewer long interconnect signal lines than in an arbiter circuit with the same numbers of ports according to the first alternative approach. In addition, the long interconnect signal lines of example arbiter circuits disclosed herein may be shorter than those of arbiter circuits of the first alternative approach (for example, due to locations of the request and grant registers). Thus, example arbiter circuits disclosed herein may be much cheaper than arbiter circuits according to the first alternative approach. In addition, it is much easier to lay out the example arbiter circuits disclosed herein within an available space for the arbiter circuit without hurting performance.

A second alternative approach to implementing a large scale arbiter circuit is to create a hierarchical arbiter circuit. In a hierarchical arbiter circuit, there are multiple stacked layers of arbitration, which may result in reducing the number of long interconnect signal wires needed for the arbiter circuit as compared to the first alternative approach. However, a hierarchical arbiter circuit may be operationally inefficient and have poor performance in certain circumstances. For example, arbitration latency may be larger in a hierarchical arbiter than in a single stage arbiter (for example, if there are X stages, the latency may be up to X times higher). As another example, arbitration may become unfair in a hierarchical arbiter, depending on the distribution of requests among the first stage arbiters (e.g., ports connected to a busy first stage arbiter may be denied more frequently than ports connected to a less busy first stage arbiter). Furthermore, the hierarchical approach may be difficult or impossible to implement in cases in which a logical port grouping is not known in advance (for example, in cases where hot plugging of target nodes is contemplated).

In contrast, certain example arbiter circuits described herein may be single stage (i.e., "flat") arbiters, and therefore do not suffer from the performance problems associated with a hierarchical approach. Moreover, certain example arbiter circuits described herein may be implemented without foreknowledge about any logical port groupings.

[Example Arbiter Circuit]

FIG. 1 illustrates an example arbiter circuit 100. The example arbiter circuit includes a number N of request circuits 110, a number M of grant circuits 120, a request register 150, and a grant register 160. The request circuits 110 may correspond respectively to the ingress ports of the crossbar for which the arbiter circuit 100 is to arbitrate. The grant circuits 120 may correspond respectively to the egress ports of the crossbar for which the arbiter circuit 100 is to arbitrate. The notation "RC_i" may be used herein to refer to a specific request circuit 110, where i is an index identifying a particular request circuit 110 with i=1, 2, . . . , N. The notation "GC_k" may be used herein to refer to a specific grant circuit 120, where k is an index identifying the particular grant circuit 120 with k=1, 2, . . . , M.

The request circuits 110 may receive arbitration requests Arb_Req from their corresponding ingress ports which specify a connection target, and, in response, generate a connection request Req (also referred to occasionally herein as a request message Req) to send to a grant side of the arbiter circuit 100. The connection request Req is written to a storage location 151 of the request register 150 that corresponds to the request circuit making the request, and includes an encoded identifier (TargID) of the connection target ("target identifier"). The request circuit 110 may also use the connection request Req to control a duration of a granted connection by indicating to the grant circuits 120 when a connection is to end. For example, the connection request Req may include an end-of-request bit for signaling an end of a granted connection, and this bit may be set when a new connection is requested to signal to the grant circuits 120 an end of the previous connection.

The grant circuits 120 may monitor the request register 150 to identify connection requests Req that are relevant to the respective grant circuits 120. In particular, each grant circuit 120 may determine whether any of the connection requests Req are relevant to it based on the values of the target identifiers TargID included in the respective connection requests Req. More specifically, a given grant circuit 120 may identify a given connection request Req as being relevant to it when an identifier (TargID) of the given request Req (which is written into the request register 150) matches the identifier of a target that is associated with the grant circuit 120. The target associated with the grant circuit 120 may be, for example, an individual egress port (i.e., the egress port that corresponds to the grant circuit 120), a group of egress ports (i.e., a port group that includes the egress port that corresponds to the grant circuit 120), a destination node (i.e., a destination node to which the egress port that corresponds to the grant circuit 120 is connected), etc.

For each of the connection requests Req that is relevant to a grant circuit 120, the grant circuit 120 may determine whether to grant the connection request. In determining whether to grant a connection request, the grant circuit 120 may arbitrate between any colliding connection requests based on arbitration rules. In addition, in examples in which a connection request Req may be relevant to more than one of the grant circuits 120, the grant circuits 120 to which the connection request Req is relevant may apply arbitration rules to determine which of them should grant the connection request. A grant circuit 120 may grant a connection request Req by writing a grant message (Gnt) to a storage location 161 of the grant register 160 that correspond to the grant circuit 120. The grant message Gnt includes an identifier (SrcID) of the request circuit 110 whose connection request is being granted ("source identifier"). In granting a connection request, the grant circuit 120 may determine the source identifier SrcID to include in the grant message Gnt based on the location 151 within the request register 150 at which the connection request Req is written. In other words, the grant circuit 120 may identify the request circuit 110 that sent the connection request Req based on the storage location 151 within the request register 150 at which the connection request Req is written.

The request circuits 110 may determine when a connection request Req has been granted by the grant circuits 120 by monitoring the grant register 160. In particular, the request circuits 110 may determine which connection requests Req have been granted and by which grant circuits 120 based on the values of the source identifiers SrcID and the locations 161 at which they are written in the grant register 160. Each of the request circuits 110 is to determine whether any of its own connection requests Req have been granted; specifically, a given request circuit 110 may determine that its request has been granted when ones of the source identifiers SrcID written into the grant register 160 matches an identifier of the given request circuit 110.

When a request circuit 110 determines that its connection request Req has been granted, it may cause the crossbar to establish a connection between a granted ingress port and a granted egress port by sending a connection granted message Arb_Gnt to the crossbar. The connection granted message Arb_Gnt may contain, among other things, an identifier of the granted egress port, and may, for example, be sent to the granted ingress port and/or to a crossbar controller (not illustrated). The request circuit 110 may determine the identifier of the granted egress port to include in the message Arb_Gnt based on the storage location 161 within the grant register 160 at which the source identifier SrcID of the grant message Gnt was written. In particular, the request circuit 110 may identify the grant circuit 120 that wrote the grant message Gnt based on the storage location 161 in which the SrcID was written, and may determine the identifier of the granted egress port to be the identifier of the egress port that corresponds to the grant circuit 120. In some examples, the identifiers of the egress ports may be the same as the identifiers of their corresponding grant circuits 120, in which case identifying the grant circuit 120 that granted the connection is equivalent to determining the identifier of the granted egress port. In other examples, the identifiers of egress ports may be different from the identifiers of their corresponding grant circuits 120, in which case the request circuits 110 may look up the identifier of the granted egress port in a lookup table or register (not illustrated) that maps egress port identifiers to grant circuit 120 identifiers.

The example arbiter circuit 100 also includes request links 111, grant links 121, read links 152, and read links 162. The request links 111 correspond respectively to the request circuits 110 (i.e., one request link 111 per request circuit 110), and are used by the request circuits 110 to write the connection requests Req to the request register 150. The grant links 121 correspond respectively to the grant circuits 120 (i.e., one grant link 121 per grant circuit 120), and are used by the grant circuits 120 to write the grant messages Gnt to the grant register 160. The request links 111 and the grant links 121 comprise interconnect signal wires that connect a request side of the arbiter circuit 100 and a grant side of the arbiter circuit 100. The read links 152 correspond respectively to the grant circuits 120, and are used by the grant circuits 120 to read the values stored in the request register 150. The read links 162 correspond respectively to the request circuits 110, and are used by the request circuits 110 to read the values stored in the grant register 160. The read links 152 and read links 162 each comprise multiple local wiring lines.

The request register 150 may include multiple storage units (not illustrated), such as flip-flops or the like, that are each to store an individual bit written from one of the request links 111. Each request link 111 may be a multi-bit link that includes multiple signal wires (e.g., one signal wire per bit), with each of the signal wires being connected to an input terminal of a different storage unit of the request register 150. Each collection of storage units of the request register 150 that are connected to the same request circuit 110 as one another via one of the request links 111 is referred to herein as a storage location 151. In other words, the storage locations 151 may each comprise multiple storage units (bits) of the register 150 that are logically grouped together by virtue of being connected to the same request circuit 110 as one another. For example, if the request links 111 are 8-bit links, then the first storage location 151 may comprise bits 1-8 of the request register 150, the second storage location 151 may comprise bits 9-16 of the request register 150, and so on. The storage units comprising a given storage location 151 may be, but do not necessarily have to be, physically contiguous within the register 150. The storage locations 151 of the request register 150 may be referred to herein using the notation "RR_i", where i is an index for identifying the storage locations 151 based on the request circuits 110 to which they correspond. Thus, for each value of i: the $i^{th}$ request circuit 110 (RC_i) corresponds to the $i^{th}$ storage location 151 (RR_i), and the $i^{th}$ request circuit 110 (RC_i) writes connection requests Req_i to the $i^{th}$ storage location 151 (RR_i) via one of the request links 111.

Figure 2:
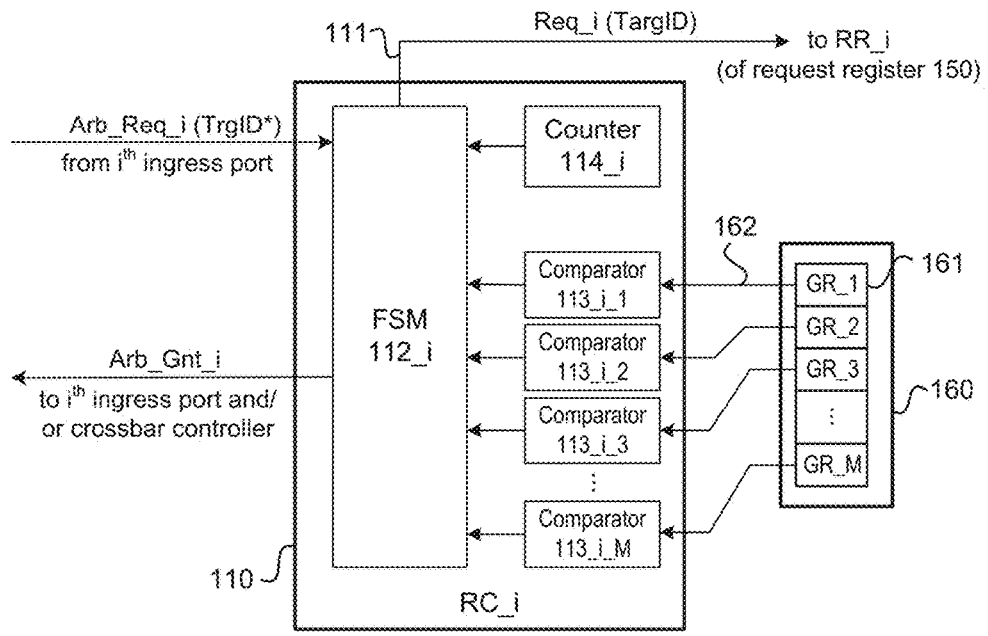
FIG. 2 illustrates an example request circuit of an example arbiter circuit.
Figure 3:
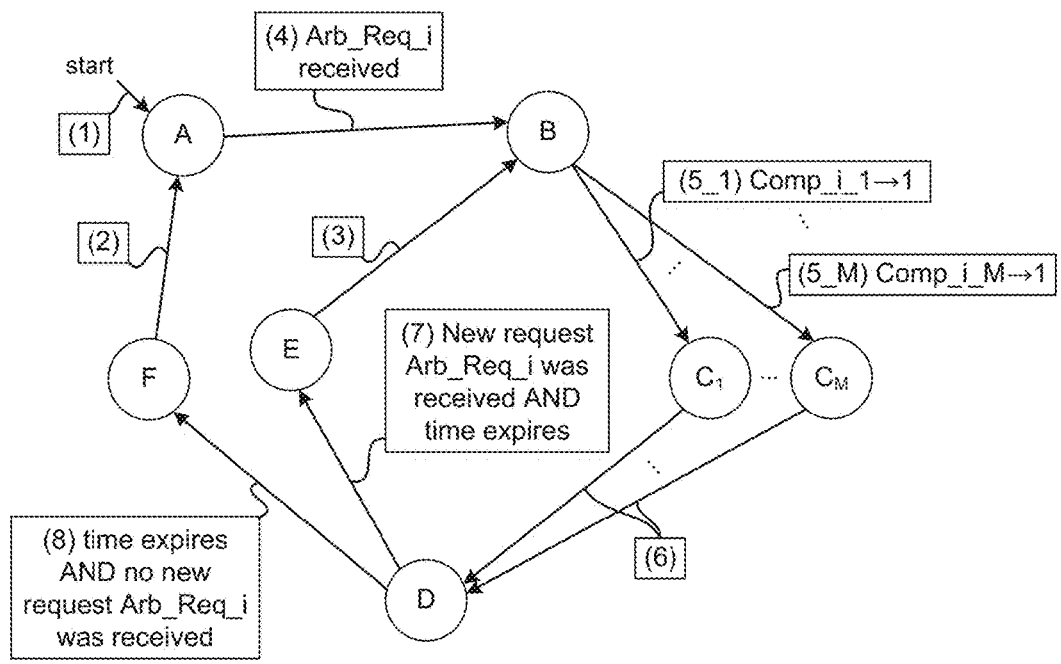
FIG. 3 illustrates states and transitions of an example finite state machine of an example request circuit.
Figure 4:
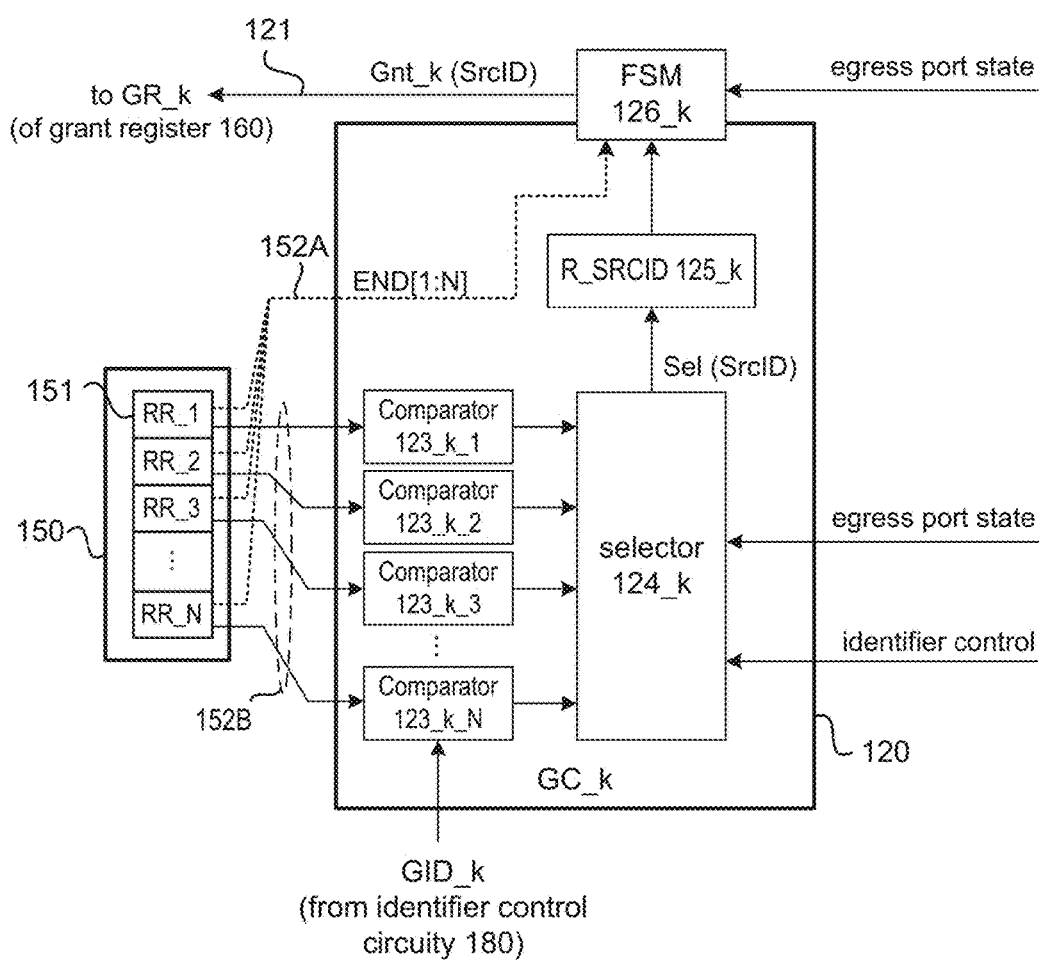
FIG. 4 illustrates an example grant circuit of an example arbiter circuit.
Figure 5:
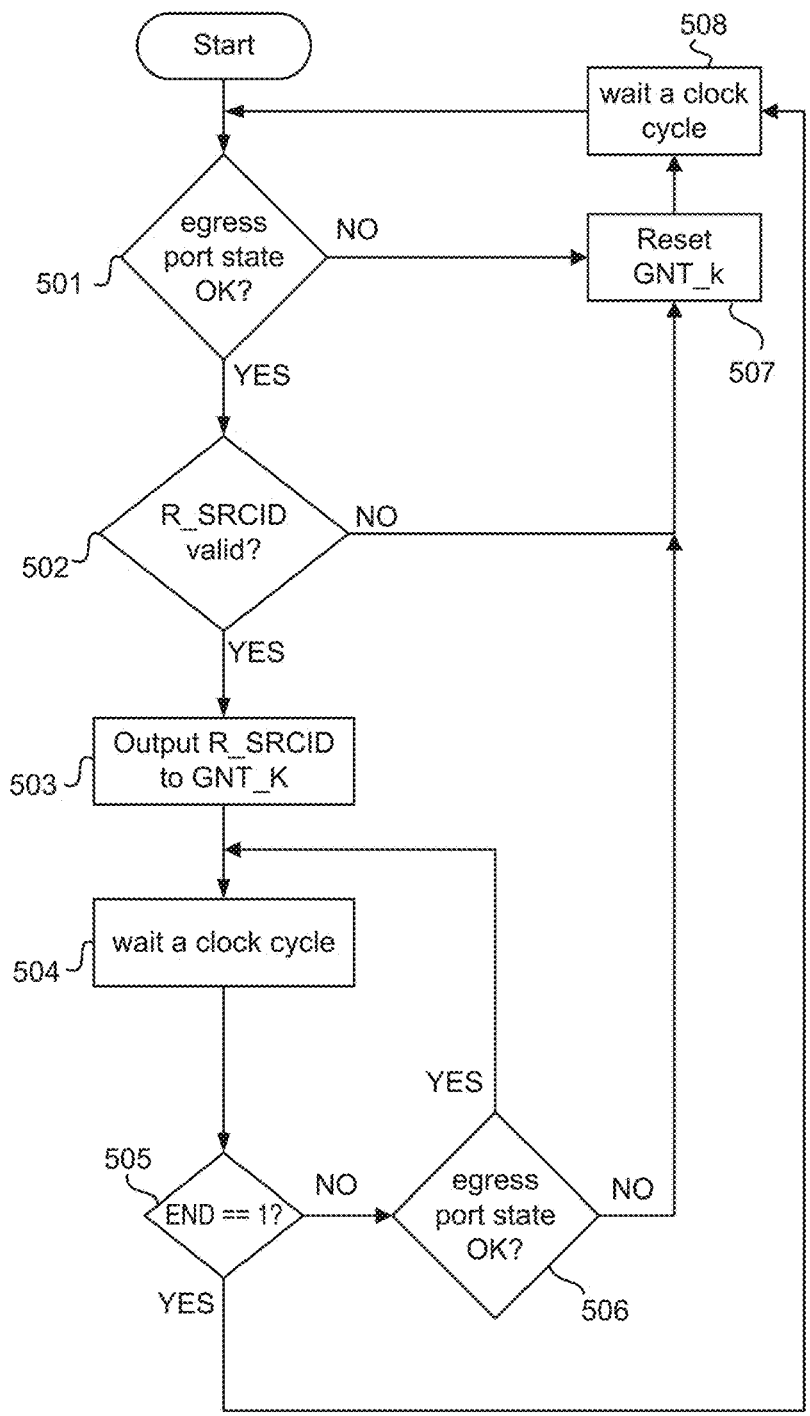
FIG. 5 is a process flow chart illustrating an example process of selecting a comparator that is executable by an example selector of an example grant circuit.

A more detailed example of how an individual request circuit 110 may be configured is illustrated in FIGS. 2 and 3 and discussed below in the "Example Request Circuit" section. A more detailed example of how an individual grant circuit 120 may be configured is illustrated in FIGS. 4 and 5 and discussed below in the "Example Grant Circuit" section.

Similar to the request register 150, the grant register 160 may include multiple storage units (not illustrated), such as flip-flops or the like, that are each to store an individual bit written from one of the grant links 121. Each grant link 121 may be a multi-bit link that includes multiple signal wires (one signal wire per bit), with each of the signal wires being connected to an input terminal of a different storage unit of the grant register 160. Each collection of storage units of the grant register 160 that are connected to the same grant circuit 120 as one other via one of the grant links 121 is referred to herein as a storage location 161. In other words, the storage locations 161 may each comprise multiple storage units (bits) of the register 160 that are logically grouped together by virtue of being connected to the same grant circuit 120 as one another. The storage units comprising a storage location 161 may be, but do not necessarily have to be, physically contiguous within the register 160. The storage locations 161 of the grant register 160 may be referred to herein using the notation "GR_k", where k is an index for identifying the storage locations 161 based on the grant circuits 120 to which they correspond. Thus, for each value of k: the $k^{th}$ grant circuit 120 (GC_k) corresponds to the $k^{th}$ storage location 161 (GR_k), and the $k^{th}$ grant circuit 120 (RC_k) writes grant messages Gnt_k to the $k^{th}$ storage location 161 (GR_k) via one of the grant links 121.

The read links 152 each connect one of the grant circuits 120 to the read terminals (output terminals) of the request register 150 such that the grant circuit 120 may read the values stored in the request register 150. More specifically, each read link 152 may be a multi-bit link that includes multiple wiring lines (one per storage unit of the request register 150), with each of the wiring lines being connected to a read terminal of a different storage unit of the request register 150. Because the request register 150 is arranged locally to the grant circuits 120, the read links 152 may be local connections that are much shorter than the request links 111 and the grant links 121. Because they are so much shorter, the cost of the read links 152 relative to the request links 111 and the grant links 121 is small.

The read links 162 each connect one of the request circuits 110 to the read terminals (output terminals) of the grant register 160 such that the request circuits 110 may read the values stored in the grant register 160. More specifically, each read link 162 may be a multi-bit link that includes multiple wiring lines (one per storage unit of the grant register 160), with each of the wiring lines being connected to a read terminal of a different storage unit of the grant register 160. Because the grant register 160 is arranged locally to the request circuits 110, the read links 162 may be local connections that are much shorter than the request links 111 and the grant links 121. Because they are so much shorter, the cost of the read links 162 relative to the request links 111 and the grant links 121 is small.

[Example Modes of Specifying Connection Targets]

As noted above, there are multiple possible targets that could be specified by the requested circuits 110 for a connection. In some examples, which may be referred to herein as "individual port targeting", the targets are individual egress ports. In examples that use individual port targeting, the identifier associated with a given grant circuit 110 is the identifier of the egress port that corresponds to the grant circuit 110.

In some examples, which may be referred to herein as "port group targeting", the targets are groups of egress ports. In examples in which port group targeting is used, the identifier associated with a given grant circuit 110 is the identifier of the port group of which the corresponding egress port is a member; in such examples, multiple grant circuits 110 may have the same identifier associated with them.

In some examples in which port group targeting is used, the targets are specific destinations external to the crossbar (such as nodes, other switches, etc.), in which case the port groups may be defined based on which egress ports are connected to which destinations. In such examples each egress port that is connected to a same destination is part of the same port group, and the, the identifier associated with a given grant circuit 110 is the identifier of the destination to which the corresponding egress port is connected.

In some examples, the arbiter circuit 100 may be configured to permanently use one of the above-noted modes of specifying targets. In other examples, the arbiter circuit 100 may be configured to be able to switch between different modes of specifying targets. In some examples, the arbiter circuit 100 may be configured to use more than one of the above-noted modes of specifying targets at the same time.

In some examples in which port group targeting is used, the sizes and/or membership of the port groups, as well as the number of port groups, may be fixed. In other examples in which port group targeting is used the sizes and/or membership of the port groups, as well as the number of port groups, may be adjusted.

In examples, in which port group targeting is used, the arbiter circuit 100 may include identifier control circuitry 180, which may control which identifier is associated with each of the grant circuits 120. The identifier control circuitry 180 may include an identifier assignment table or register (not illustrated) for recording which identifiers are associated with which grant circuits 120. A grant circuit 120 may determine what its associated identifier is by reading from a corresponding location of the identifier assignment table or register. In such an example, the identifiers associated with grant circuits 120 may be variably changed by changing the values written in the table or register. Processing circuitry (not illustrated) may control the writing of the identifiers to the identifier assignment table or register. In addition to specifying the identifiers of each grant circuit 120, the identifier control circuitry 180 may also notify each of the grant circuits 120 what targeting mode is being used, as well as what other egress ports (if any) are part of the same port group.

In examples in which port group targeting is used, the identifier control circuitry 180 may variably set which egress ports are members of which port groups by writing identifiers to the identifier assignment table or register. Specifically, in such an example, an egress port may be assigned to a port group by writing a group identifier of the port group in a location corresponding to the egress port. In such an example, for each of the grant circuits 120, the identifier that is associated with the grant circuit 120 is the group identifier of the port group that its corresponding egress port is a member of, which the grant circuits 120 may read from the identifier assignment table or register. The grant circuits 120 may also read the identifiers assigned to other grant circuits 120 to determine which other grant circuits 120 are in the same group as themselves, which may be relevant, for example, to the arbitration rules applied by the grant circuits. In such an example, the membership of the port groups may be variably changed by changing the group identifiers written in the identifier assignment table or register. In certain examples, the port groups may be determined based on instructions received from a client device, a user, a controller of the crossbar, etc.

In examples in which port group targeting is used and in which the targets are destinations (e.g., nodes), the identifier control circuitry 180 may determine and keep track of an identifier for each destination. In particular, the identifier assigned by the control circuitry 180 to a destination may be different from other identifiers that might be associated with the destination (such as an IP address), and the identifier control circuitry 180 may maintain a mapping between its assigned identifiers and another identifier of the destination. The identifier control circuitry 180 may also keep track of which egress ports are connected to which destinations, and update the port group assignments based thereon by updating the identifiers stored in the identifier assignment table. In such an example, the identifiers associated with grant circuits 120 may be updated on the fly as egress ports are connected/disconnected to/from destinations.

In examples in which more than one egress port may be associated with the same target (such as examples in which group targeting is used), a situation may arise in which a single connection request Req is relevant to more than one of the grant circuits 120. For example, in a group targeting scenario, a connection request Req specifying a target identifier TargID="2" is relevant to all of the grant circuits 120 associated with group "2". In such a case, the effected grant circuits 120 may arbitrate the request so as to avoid having more than one of the grant circuits 120 grant the same request (hereinafter referred to as the "single grantor" condition). In some examples, the single grantor condition is achieved by causing the grant circuits 120 to work together in arbitrating the request, for example via a distributed decision making technique. In some examples, by appropriately designing the arbitration rules the single grantor condition may achieved even with each of the grant circuit 120 making independent decisions.

The following is one example set of arbitration rules that may allow the single grantor condition to be achieved with independent decision making by the grant circuits 120. In this example, each grant circuit 120 in the group may have a relative priority associated with it. When a connection request Rew specifies the target identifier TargID of a particular port group, if there are no grant circuits 120 in the specified port group that are available then none of the grant circuits 120 in the port group grant the request. In this context, a grant circuit 120 is available if its egress port is enabled and it does not already have another granted connection. If there are one or more grant circuits 120 in the specified port group that are available, then the grant circuit 120 with the highest priority out of the available grant circuits 120 may grant the request, while the other available grant circuits 120 do not grant the request. The grant circuits 120 may each receive egress port status information, as well as group membership information, which enables each grant circuit 120 to separately identify which grant circuits 120 are in their same port group and which of those grant circuits 120 are available. For example, suppose that the lower the identifier number of the grant circuit 120, the higher the priority (e.g., GC_1 has highest priority, GC_2 has next highest, and so on). Further suppose that GC_1 through GC_6 are in port group "1", egress ports 2 and 4 are currently servicing connections, and egress port 1 is disabled. In such an example, GC_3 would determine (independent from the other grant circuits 120) that it should grant the connection request, because it knows that it has the highest priority out of the available grant circuits 120 (GC_3, GC_5, GC_6). GC_5 and GC_6 would separately determine (independent from the other grant circuits 120) that they are not to grant the connection request, because they would both know that GC_3 is also available and has a higher priority than they do.

The above example is merely one possible set of arbitration rules. Any other arbitration rules currently known or later devised may be used by the grant circuits 120 to arbitrate between colliding connection requests Req and/or to select a grant circuit 120 when a request is relevant to multiple grant circuits 120.

[Example Arbitration Using Individual Port Targeting]

A first example arbitration sequence is described below. In this example, it is assumed for simplicity that the arbiter circuit 100 is using individual port targeting. In this example, it is assumed that the sixth ingress port desires a connection with the second egress port.

The sixth ingress port sends an arbitration request Arb_Req_6 to the sixth request circuit 110 (RC_6), specifying the second egress port as a target. In response, RC_6 requests a connection by writing a message Req_6 that including an identifier associated with the second egress port to the sixth storage location 151 (RR_6) of the request register 150. Specifically, RC_6 writes the identifier TargID="2" into RR_6. In this example, the value "2" is written because this is the identifier of the target (i.e., the second egress port), and it is written to RR_6 because the requesting request circuit 110 is RC_6.

GC_2 would identify the writing of TargID=2 to RR_6 as being a request that is relevant to it, since the written TargID matches the identifier associated with GC_2 (the identifier associated with GC_2 in this case is its own individual identifier, namely "2"). GC_would also determine that the requesting request circuit 110 is RC_6 because the storage location 151 that TargID was written to is RR_6. GC_2 would determine whether to grant the connection by applying arbitration rules.

If GC_2 decides not to grant the connection, it may do nothing in regard to the message, which RC_6 will interpret to mean the request is not granted. Specifically, if RC_6 does not detect its identifier being written in the grant register 160, it will interpret this to mean that its request is not granted. In such a case, RC_6 may continue to assert the request and wait for the connection to eventually be granted by keeping TargID="2" written into RR_6. Alternatively, RC_6 may attempt to connect to a different egress port by writing a different TargID to RR_6.

If and when GC_2 decides to grant the connection, it may write the identifier of the requesting circuit SrcID="6" into GR_2 of the grant register 150. The value 6 is written because this is the identifier of the requesting request circuit 110 (RC_6), and it is written to GR_2 because it is GC_2 that is granting the connection to the second egress port. RC_6 would identify the writing of SrcID=6 to GR_2 as an indication that its request has been granted, because the SrcID written matches its identifier. RC_6 would also determine that the egress port for which the connection is granted is the second egress port because the storage location 161 that SrcID was written to is GR_2. RC_6 would then generate a grant message Arb_Gnt_6 to send to crossbar that identifies the second egress port.

[Example Arbitration Using Port Group Targeting]

A second example arbitration sequence is described below. In this example, it is assumed for simplicity that the arbiter circuit 100 is using port group targeting. In this example, it is assumed that the sixth ingress port desires a connection with a third port group, which comprises ports 9, 10, 11, and 12. In this example, the identifier of the third port group is "3".

The sixth ingress port sends an arbitration request $Arb_{13}$ Req_6 to the sixth request circuit 110 (RC_6), specifying the third port group as a target. In response, RC_6 requests a connection by writing a message Req_6 that including an identifier associated with the third port group to the sixth storage location 151 (RR_6) of the request register 150. Specifically, RC_6 writes the identifier TargID="3" into RR_6. In this example, the value "3" is written because this is the identifier of the target (i.e., the third port group), and it is written to RR_6 because the requesting request circuit 110 is RC_6.

In this example, all of the grant circuits 120 that correspond to an egress port that is part of the third port group would identify this request as being relevant to them. In particular, GC_9, GC_10, GC_11, and GC_12 would all identify the writing of TargID=3 to RR_6 as being a request that is relevant to them, since the written TargID matches the identifier that is associated with them. GC_9, GC_10, GC_11, and GC_12 would be able to determine that the requesting request circuit 110 is RC_6 because the TargID was written to RR_6. GC_9, GC_10, GC_11, and GC_12 would determine whether to grant the connection, as well as for which egress port in the third port group the connection will be granted, by applying arbitration rules.

If GC_9, GC_10, GC_11, and GC_12 all decide not to grant the connection, they may do nothing in regard to the message, which RC_6 will interpret to mean the request is not granted. Specifically, if RC_6 does not detect its identifier being written in the grant register 150, it will interpret this to mean that its request is not granted. In such a case, RC_6 may continue to assert the request and wait for the connection to eventually be granted by keeping TargID="3" written into RR_6. Alternatively, RC_6 may attempt to connect to a different port group by writing a different TargID to RR_6.

If and when any one of GC_9, GC_10, GC_11, and GC_12 decides to grant the connection, it may write the identifier of the requesting circuit SrcID="6" into a corresponding storage location 161 of the grant register 160. For example, if GC_10 is to grant the connection, it may write SrcID=6 to GR_10. The value 6 is written because this is the identifier of the requesting request circuit 110 (RC_6), and it is written to GR_10 because it is GC_10 that is granting the connection to the tenth egress port. RC_6 would identify the writing of SrcID=6 to GR_10 as an indication that its request has been granted, because the SrcID written matches its identifier. RC_6 would also determine that the egress port for which the connection is granted is the tenth egress port because the SrcID was written to GR_10. RC_6 would then generate a grant message Arb_Gnt_6 to send to crossbar that identifies the tenth egress port.

[Example Request Circuit]

FIG. 2 illustrates an example request circuit 110 and an example grant register 160. The example request circuit 110 may include a finite state machine (FSM) 112, M comparators 113 (e.g., comparators 113_i_1 through 113_i_M), and a counter 114. The example request circuit 110 illustrated in FIG. 2 is the $i^{th}$ request circuit 110 (RC_i), and therefore some of its components are labeled with the index i in the Figure.

The FSM 112 may receive arbitration requests Arb_Req from the ingress port to which the request circuit 110 corresponds. The arbitration requests Arb_Req may include an identifier TargID* to identify a connection target. The FSM 112 may generate a request Req that includes an identifier TargID of the target based on Arb_Req, and write Req to the grant register 160 via one of the request links 111. In some examples, the identifiers used by the ingress port and the request circuit 110 to identify the target may be the same (i.e., TargID* and TargID may be the same). In other examples, different identifiers may be used by the ingress port and the request circuit to identify the target (i.e., TargID* and TargID are not the same), and the FSM 112 may translate between the different identifiers. For example, the FSM 112 may be connected to an index table (not illustrated) that relates TargID* values to TargID values.

The comparators 113 may each be connected by a read link 162 to a corresponding one of the storage locations 161 of the grant register 160. Specifically, in a given RC_i, the comparator 113_i_k is connected to GR_k for each value of k (recall that k=1, 2, . . . , M). The comparators 113 are each to compare the value stored in the storage location 161 to which they are connected to the identifier of their request circuit 110. In other words, a given comparator 113_i_k is configured to compare the value stored in GR_k to SrcID_i (where SrcID_i the identifier of the RC_i). The comparators 113 indicate a match to the FSM 112; for example, a comparator 113_i_k may output a logical 1 to the FSM 112 if the value in GR_k matches SrchID_i. A comparator 113 indicating a match is one example of how a request circuit 110 may determine that its requested connection has been granted.

The FSM 112 may monitor the outputs of the comparators 113 to detect any indications of matches. If a match is detected by one of the comparators 113, the FSM 112 may generate an arbitration grant message Arb_Gnt based on which comparator 113 indicated the match. In particular, the FSM 112 may determine which egress port a connection is granted for based on which comparator 113 indicated the match, and may include an identifier EgrsID of the egress port in the arbitration grant message Arb_Gnt. For example, if the comparator 113_i_k indicated the match, then the FSM 112 may include EgrsID_k in the arbitration grant message Arb_Gnt. The arbitration grant message Arb_Gnt may be sent to the crossbar, thereby informing the crossbar of the granted connection. In some examples, the arbitration grant message Arb_Gnt may include a grant notification that is sent to the corresponding ingress port, and the identifier EgrsID that is sent to a controller of the crossbar. The sending of the grant message Arb_Gnt to the crossbar is one example of how the request circuit 110 may cause the crossbar to establish the connection.

The counter 114 may be used to determine the duration of a granted connection by counting clock cycles. For example, the counter 114 may be reset when a new connection is granted, and the FSM 112 may end the connection when the counter 114 reaches a value T corresponding to a desired duration of the connection. The desired duration of the connection may be communicated by the ingress port in the arbitration request Arb_Req.

An example implementation of the FSM 112 is defined by the states and transition conditions shown in the table below. FIG. 3 illustrates the possible transitions between states. It should be understood that this is but one example implementation if the FSM 112.

| State Name | STATE Signals output by FSM 112 in the state | TRANSITION CONDITIONS |
| --- | --- | --- |
| A | No output; | (1) initial state; OR (2) state F reached |
| B | Output Req_i that includes TargID that is based on Arb_Req_i | (3) state E reached; OR (4) in state A: request received on Arb_Req_i |
| $C_k$ | Output Req_i that includes TargID from state B Output Arb_Gnt_i that includes EgrsID_k, and grant notification to $i^{th}$ ingress port | ($5_k$) In state B: Comp_n_k outputs a 1 (i.e., GR_k == SrcID_i) |
| D | Output Req_i that includes the TargID from state $C_k$, and Output Arb_Gnt_i that includes EgrsID from state $C_k$ | (6) State $C_k$ reached |
| E | Output Req_i that includes: a TargID that is based on new Arb_Req_i, and a 1 for the END bit | (7) In state D: new request received on Arb_Req_i, AND time expires |
| F | Output Req_i that includes a 1 for the END bit (and no TargID) | (8) In state D: time expires, AND no new request received on Arb_Req_i |

In the state A, no signals are output by the FSM 112 (or, alternatively, the signals Req_i and Arb_Gnt_i output by the request circuit RC_i include default values, such as all zeros). The state A is the initial state of the FSM 112 (condition (1)). The FSM 112 may also transition to state A if the FSM 112 has reached state F (condition (2)).

In the state B, a signal Req_i is output that includes an identifier TargID that is obtained based on the most recent Arb_Req_i message. The FSM 112 may transition to state B if the FSM 112 has reached state E (condition (3)). The FSM 112 may also transition to state B if, while in state A, a request Arb_Req_i is received (condition (4)).

In any of the states $C_k$, a signal Req_i is output that includes the TargID from the state B that the FSM 112 was in immediately prior to reaching the state $C_k$. In addition, in any of the states $C_k$, a signal Arb_Gnt_i is output that includes the identifier EgrsID_k of the $k^{th}$ egress port and a grant notification to the $i^{th}$ ingress port. The FSM 112 may transition to the state $C_k$ if, while in state B, the comparator 113_i_k indicates a match (e.g., outputs a logical 1) (condition (5)). Note that state $C_k$ represents M distinct states: $C_1, C_2, \ldots, C_M$, and that which of these states $C_k$ is reached depends on which comparator 113 indicates a match. Thus, for example, if comparator 113_i_9 outputs a 1, then state $C_9$ is reached and the FSM 112 outputs EgrsID_9 as part of Arb_Gnt_i.

In the state D, a signal Req_i is output that includes the TargID from the state $C_k$ that the FSM 112 was in immediately prior to reaching the state D. In addition, in the state $C_k$ a signal Arb_Gnt_i is output that includes the identifier EgrsID from the state $C_k$ that the FSM 112 was in immediately prior to reaching the state D. The FSM 112 may transition to state B if the FSM 112 has reached any of the states $C_k$ (condition (6)).

In the state E, a signal Req_i is output that includes an identifier TargID that is obtained based on the most recent Arb_Req_i message. In addition, in the state $C_k$ the signal Req_i includes a 1 in the END bit. The FSM 112 may transition to state E if, while in state D, time expires for the current connection and a new request Arb_Req_i was received at some point in before the time expires (condition (7)). The FSM 112 may determine that time expires for the current connection based on the value output by the counter 114. In this context, a "new" request Arb_Req_i is any request Arb_Req_i that is received after the request Arb_Req_i of the most recent state B.

In the state F, a signal Req_i is output that includes a 1 for the END bit but does not include a TargID (or alternatively includes a default value, such as all zeros, for the TargID). The FSM 112 may transition to state E if, while in state D, time expires for the current connection and no new request Arb_Req_i was received since the most recent state B (condition (7)). The FSM 112 may determine that time expires for the current connection based on the value output by the counter 114.

[Example Grant Circuit]

FIG. 4 illustrates an example grant circuit 120. The grant circuit 120 includes N comparators 123 (e.g., comparators 123_k1 through 113_k_N), a selector 124 a register 124, and a FSM 126. The example grant circuit 120 illustrated in FIG. 4 is the $k^{th}$ grant circuit 120 (GC_k), and therefore some of its components are labeled with the index k in the Figure. As described above, GC_k reads values from the request register 150 via the read lines 152, and outputs a signal Gnt_k to a corresponding one of the grant lines 121.

The comparators 123 may each be connected by a read link 152 to a corresponding one of the storage locations 151 of the request register 150. Specifically, in a given GC_k, the comparator 123_k_i is connected to RR_i for each value of i (recall that i=1, 2, . . . , N). The comparators 123 are each to compare the target identifier TargID stored in the storage location 151 to which they are connected to an identifier GID that is associated with of their grant circuit 120. In other words, a given comparator 123_k_i is configured to compare the target identifier TargID stored in RR_i to GID_k (where GID_k is the identifier associated with the GC_k). The comparators 123 indicate any matches to the selector 124; for example, a comparator 123_k_i may output a logical 1 to the selector 124 if the target identifier TargID in RR_i matches GID_k. A comparator 123 indicating a match is one example of how a grant circuit 120 may identify a connection request as being relevant to it. A comparator 123 indicating a match is also one example of how a grant circuit 120 may identify one of the egress ports based on the respective encoded identifier stored in the request register.

In certain examples, the value of the identifier GID_k may be fixed. In other example, the value of the identifier GID_k may be changeable. For example, in examples that use port group targeting, if the $k^{th}$ egress port is assigned to a different port group, then GID_k may be changed to match an identifier of the new port group. For example, GID_k may be read from a $k^{th}$ storage location of a group assignment table or register (not illustrated) of group control circuitry 180. As another example, in examples that use destination targeting, if the $k^{th}$ egress port is connected to a different destination, then GID_k may be changed to match an identifier of the new destination. For example, GID_k may be read from a $k^{th}$ storage location of a destination tracking table or register (not illustrated) of destination tracking circuitry 190.

In certain examples, each grant circuit 120 may have its own individual set of comparators 123. However, in some examples multiple grant circuits 120 may share a set of comparators 123 among themselves. For example, in some examples in which port group targeting is used, a single set of comparators 123 may be provided per group, and the outputs thereof may be routed to the selector 124 of each of the grant circuits 120 in the same group.

In examples in which individual port targeting and port group targeting may be used simultaneously, each of the grant circuits 120 may include additional comparators 123. In particular, in such an example, there may be two comparators 123 for each storage location 151 of the corresponding request register 151. One of the two comparators 123 may compare the target identifier TargID of its storage location 151 to the individual identifier of the grant circuit 120, while the other of the two comparators 12 may compare the target identifier TargID of its storage location 151 to the group identifier of the port group that includes the grant circuit 120.

The selector 124 may monitor the outputs of the comparators 123 to detect any indications of matches, and select one of the comparators 123 that indicates a match. If a match is detected by just one of the comparators 123, the selector 124 may select that comparator 123 and output a selection signal Sel that includes an identifier SrcID of the request circuit 110 that corresponds to the storage location 151 read by the selected comparator 123. If a match is detected by more than one of the comparators 123, the selector 124 may select one of the comparators 123 based on arbitration rules, and output a selection signal Sel that includes an identifier SrcID of the request circuit 110 that corresponds to the selected comparator 123. The selector 124 may determine the SrcID of the requesting request circuit 110 based on which comparator 123 indicated the match. For example, if the $i^{th}$ comparator 123_k_i indicated the match, then the selector may include SrcID_i (the identifier of the $i^{th}$ request circuit 110) in the selection signal Sel. The selection signal Sel may be written to the register 125, which may also be referred to as R_SRCID. The selector 124 may update is selection and output a new selection signal Sel periodically (for example, each clock cycle).

Any arbitration rules may be used by the selector 124. For example, a first-in-first-out (FIFO) arbitration rule may be applied. As another example, the comparator 123_k_i with the lowest or highest value of i out of those that indicated a match may be selected. As another example, a priority order may be established among the comparators 123, and the comparator 123 with the highest priority out of those that indicated matches may be selected. As another example, a running tally of the number of and/or durations of connections granted recently to each ingress node may be kept, and comparators 123 may be selected based on these tallies so as to enforce some notion of access fairness.

In some examples in which port group targeting is enabled, the selector 124 may be made aware of the membership of the port group in which it is included (if any), as well as the states of the other egress ports in its port group, and may make the selection based at least in part on this information. For example, when port group targeting is used, the selector 124 may need to know which other egress ports in its group are enabled and which are currently servicing a granted connection in order to determine whether it should service the requested connection or defer to another one of the grant circuits 120 in the same group.

The selector 124 may be implemented via logic circuitry that is configured to perform the operations described herein in relation to the selector 124. Such logic circuitry may include dedicated hardware (such as an ASIC, FPGA, CPLD, etc.), and/or a general purpose processing device (such as a central processing unit (CPU)) executing program instructions stored on a non-transitory machine readable medium.

In some examples, the selector 124 may also be made aware of the ending of a granted connection. For example, the selector 124 may read the END bit (described below) of each storage location 151 of the request register 150 to determine when a granted connection is ended. In certain examples, the selector 124 may be made aware of when the FSM 126 outputs a new grant message Gnt_k, and may adjust its arbitration rules based on this event (e.g., decrease the priority of the comparator 123 whose SrcID was included in the new grant message Gnt_k).

The FSM 126 detects the ending of any already granted connections, and when a current connection ends the FSM 126 reads the SrcID stored in the R_SRCID 125 and outputs a grant signal Gnt that includes the read SrcID. The FSM 126 may also monitor the state of the egress port that corresponds to the grant circuit 120, and the grant signal Gnt may depend on the egress port state. In particular, if the egress port state is normal, then the grant signal Gnt output by the FSM 126 includes the identifier SrcID obtained from the R_SRCID. However, if the egress port is disabled, then the FSM 126 does not output a grant signal Gnt (or alternatively outputs a grant signal Gnt with a default value, such as all zeros).

In certain examples, the ending of a currently granted connection may be indicated by the request circuit 110 associated with the connection writing a predetermined value (e.g., 1) to a dedicated bit (the "END bit") of its corresponding storage location 151. For example, RC_3 may indicate that a currently granted connection between the $3^{rd}$ ingress port and the 5th egress port is ending by writing a "1" to RR_3 of the request circuit 150. The FSM 126 may be connected to the END bit of each storage location 151 via the read lines 152. In FIG. 4, the read lines 152 connecting the FSM 126 to the END bits of the storage locations 151 are labeled 152A, while the read lines 152 connecting the comparators 123 to the TargID bits of the storage locations 151 are labeled 152B.

Using the END bit to notify the grant circuit 120 of the end of connection may enable back-to-back connection requests from the same request circuit 110 to be handled fairly. For example, if the RC_1 was granted a connection to a target with identifier "2", and then RC_1 requested a second connection to the target 2 immediately after the first connection by writing TargID=2 again to RR_1, then the grant circuit 120 may not detect this second writing of the TargID=2 to RR_1 as being a second request, and may instead see this as merely a continuation of the granted connection. This may be unfair to other ingress ports that may have been waiting for RC_1's first connection to end so that they could have their turn connecting to the target "2". However, with the END bit, the grant circuit 120 may recognize the second writing of TargID=2 to RR_1 as being a second connection request, and thus may prioritize RC_1's request fairly in view of the other pending requests.

In addition, using the END bit to notify the grant circuit 120 of the end of connection may enable pipelining of requests, thus reducing the latency of the grant circuits 120. For example, because the grant circuit 120 may know that a requested connection is to end soon (e.g., at the next clock cycle), the grant circuit 120 may start the arbitration process for selecting the next connection to grant before the currently granted connection actually ends.

For example, the FSM 126 may be configured to perform the process illustrated in FIG. 5. In block 501 of the example process, the FSM 126_k determines whether the state of the egress port corresponding to the grant circuit 120 (i.e., the $k^{th}$ egress port) is okay—i.e., whether the $k^{th}$ egress port is enabled. If the egress port is not okay (NO), then the process continues to block 507, where the FSM 126_k resets the grant message Gnt_k. If the egress port is okay (YES), then the process continues to block 502.

In block 502, the FSM 126_k determines whether the current value SrcID stored in R_SRCID 125_k is valid. For example, an invalid value of SrcID may indicate that the selector 124_k has not selected any comparators 123_k. For example, an invalid value of SrcID may be a default value, such as all zeros. As another example, a flag may be used to indicate validity of SrcID. If the SrcID is invalid (NO), then the process continues to block 507, where the grant message Gnt_k is reset. If the SrcID is valid (YES), then the process continues to block 503.

In block 503, FSM 126_k outputs the grant message Gnt_k containing the current value SrcID stored in R_SRCID 125_k to a corresponding one of the grant links 121. The process then continues to block 504.

In block 504, the FSM 126_k waits till the next clock cycle. In the meantime, the current grant message Gnt_k (from block 503) continues to be output. The process then continues to block 505.

In block 505, the FSM 126_k determines whether there is an indication that the currently granted connection is to end. For example, the FSM 126_k may determine whether the END bit of the storage location 151 that corresponds to the request circuit 110 of the currently granted connection is equal to 1. For example, if the currently granted connection is with the $3^{rd}$ ingress port, then the FSM 126_k may determine whether the END bit of RR_3 is equal to 1. If the connection is not to end (NO), then the process continues to block 506. If the connection is to end (YES), then the process continues to block 508.

In block 506, the FSM 126_k determines whether the state of the egress port corresponding to the grant circuit 120 (i.e., the $k^{th}$ egress port) is okay—i.e., whether the $k^{th}$ egress port is enabled. If the egress port is not okay (NO), then the process continues to block 507, where the FSM 126_k resets the grant message Gnt_k. If the egress port is okay (YES), then the process loops back to block 504, where the current grant message Gnt_k (from block 503) continues to be output for another clock cycle.

In block 507, the FSM 126_k resets the grant message Gnt_k. For example, resetting the grant message Gnt_k may include outputting no message, or outputting a default message (such as all zeros). The process then continues to block 508.

In block 508, the FSM_k waits till the next clock cycle. The process then loops back to block 501.

An example implementation of the FSM 126 is defined by the states and transition conditions shown in the table below. It should be understood that this is but one example implementation if the FSM 126.

| STATE | | |
|---|---|---|
| State name | Output by FSM | TRANSITION CONDITIONS |
| G | 00 . . . 0 | (9) initial state; OR<br>(10) In states H or J:<br>$k^{th}$ egress port disabled |
| H | Output Gnt message that includes the current value of R_SrcID | (11) in state G:<br>R_SRCID is valid, and $k^{th}$ egress port is enabled; OR<br>(12) in state J:<br>END bit of RR_q equals "1" where q is the SrcID output in state J; AND<br>R_SRCID is valid; AND $k^{th}$ egress port is enabled |
| J | Continue to output Gnt that includes SrcID from previous state H | (13) state H reached |

The state G in the state table above corresponds to block 506 in the example process above. The state H in the state table above corresponds to block 503 in the example process above. The state J in the state table above corresponds to block 504 in the example process above. The condition (10) in the table above corresponds to either of blocks 501 or 506 being answered NO in the example process above. The condition (11) in the table above corresponds to block 501 and then block 502 being answered YES in the example process above. The condition (12) in the table above corresponds to block 505, then block 501, and then block 502 all being answered YES in the example process above.

In the description above, various references are made to "selecting" or "identifying" various entities, including an ingress port, its corresponding request circuit 110, its corresponding storage location 151, and/or its corresponding comparator 123. It should be understood that "selecting" or "identifying" any one of these entities may be done by "selecting" or "identifying" anything that is logically associated with the entity, such as "selecting" or "identifying" an identifier associated with the entity, "selecting" or "identifying" another corresponding entity, etc. Thus, for example, the selector 124_k may "select the comparator 123_k_3" by selecting the number "3", which is an identifier of the comparator 123_k_3. As another example, in selecting the comparator 123_k_3, the selector 124_k is also selecting the request circuit 110_3, which corresponds to the comparator 123_k_3.

[Second Example Arbiter Circuit]

Figure 6:
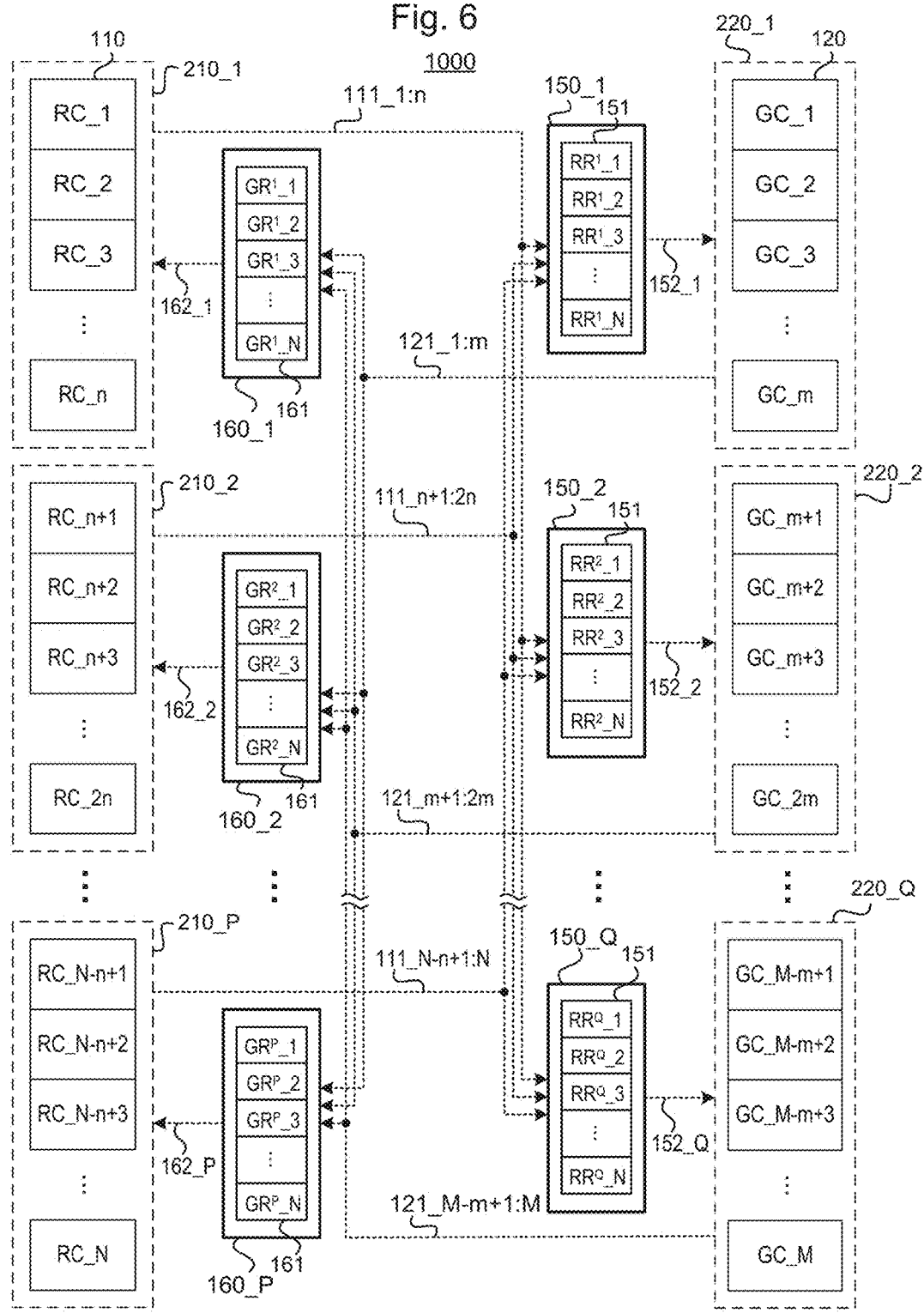
FIG. 6 illustrates another example arbiter circuit.

FIG. 6 illustrates a second example arbiter circuit 1000. The second example arbiter circuit 1000 may include certain features that are similar to features of the first example arbiter circuit 100. For such similar features, the same reference numbers are used in herein and in the Figures, and duplicative description of the features may be omitted below.

In particular, similar to the first arbiter circuit 100, the second arbiter circuit 1000 includes a number of request circuits 110 that correspond respectively to the ingress ports of the crossbar and a number of grant circuits 120 that correspond respectively to the egress ports of the crossbar. The internal configuration of individual request circuits 110 and grant circuits 120 of the second arbiter circuit 1000 may be similar to that described above in relation to the first arbiter circuit 100, and hence duplicative description thereof is omitted.

However, in the second arbiter circuit 1000 the request circuits 110 are grouped into multiple request sections 210—specifically, P request sections 210_1 through 210_P, where P is any integer greater than one. Similarly, in the second arbiter circuit 1000 the grant circuits 120 are grouped into multiple grant sections 220—specifically, Q grant sections 220_1 through 220_Q, where Q is any integer greater than one. P and Q may be, but do not have to be, equal to one another.

The second arbiter circuit 1000 further includes multiple request registers 150 (i.e., 150_1 through 150_Q) and a multiple grant registers 160 (i.e., 160_1 through 160_P). In particular, each request register 150 corresponds to one grant section 220, and each grant register 160 corresponds to one request section 210. Each request register 150 is read by the grant circuits 120 in its corresponding grant section 220, and each grant register 160 is read by the request circuits 110 in its corresponding request section 210. Each of the request registers 150 may have the same configuration as the other request registers 150, which may be similar to that described above in relation to the first arbiter circuit 100, and hence duplicative description thereof is omitted.

Each of the request sections 210 includes at least one request circuit 110, and may include multiple request circuits 110. In particular, all of the request circuits 110 that monitor the same grant register 160 are part of the same request section 210. Similarly, each of the grant sections 220 includes at least one grant circuit 120, and may include multiple grant circuits 120. In particular, all of the grant circuits 120 that monitor the same request register 150 are part of the same grant section 220.

In FIG. 6 and herein, the notation $RR^p\_i$ is used to identify the $i^{th}$ storage location 151 of the $p^{th}$ request register 150_p. Similarly, in FIG. 6 and herein, the notation $GR^q\_k$ is used to identify the $k^{th}$ storage location 161 of the $q^{th}$ request register 150_q. In FIG. 6 it is assumed for simplicity that there are n request circuits 110 in each request section 210, where n is an integer equal to or greater than 1. Similarly, in FIG. 6 it is assumed for simplicity that there are m grant circuits 120 in each grant section 220, where m is an integer equal to or greater than 1. However, it is also possible for request sections 210 to have different numbers of request circuits 110 than one another, and/or for grant sections 220 to have different numbers of grant circuits 120 than one another.

Figure 7:
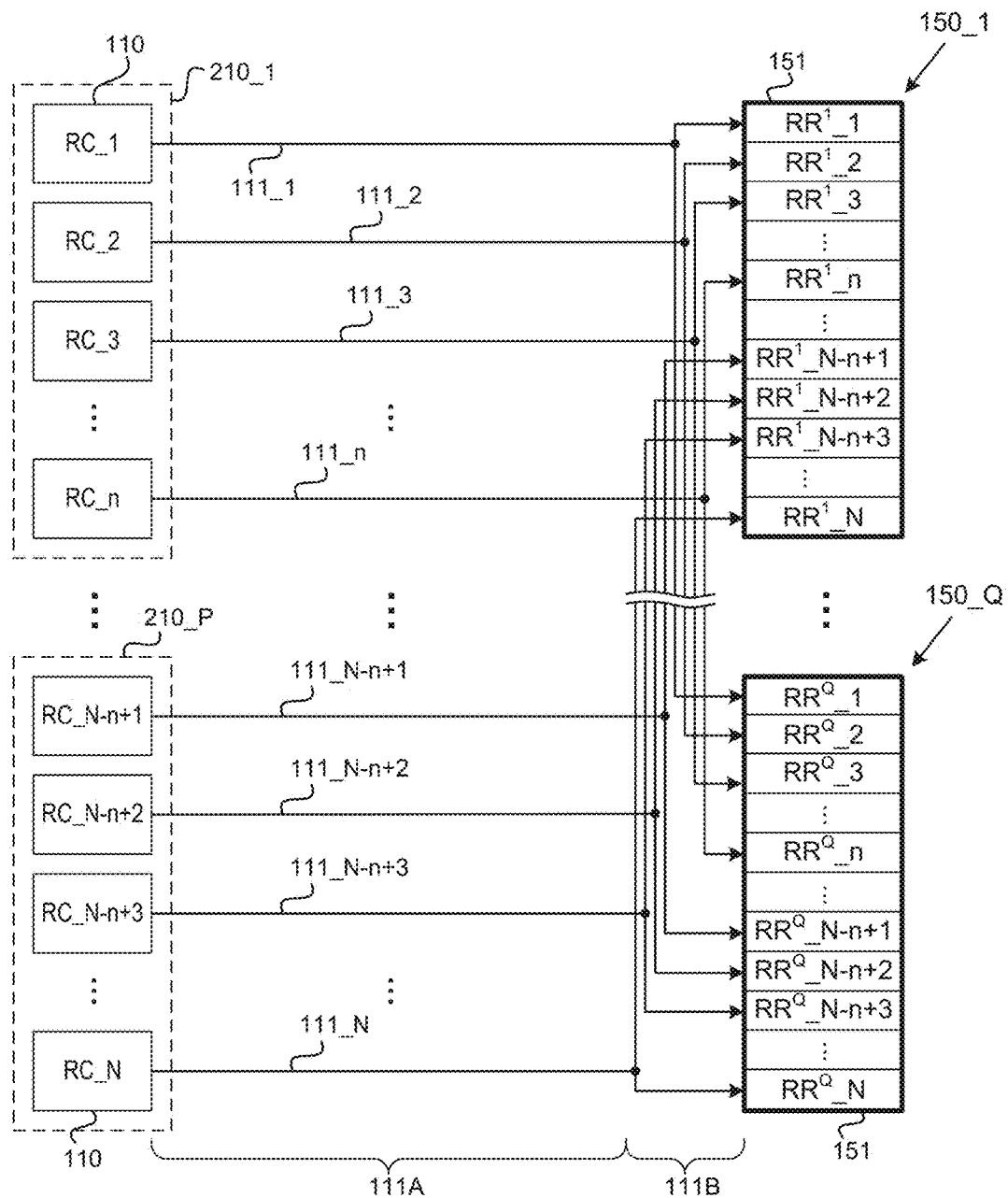
FIG. 7 illustrates example connections between request circuits and request registers of an example arbiter circuit.

In the second arbiter circuit 1000, each of the request circuits 110 is connected to a corresponding storage location 151 in each of the request registers 150 via a request link 111. For example, as illustrated in FIG. 7 the first request circuit 110 (RC_1) is connected via a first request link 111_1 to the first storage location 151 of each of the request registers 150_1 through 150_Q (namely, $RR^1\_1$, $RR^2\_1$, . . . , $RR^Q\_1$), the second request circuit 110 (RC_2) is connected via a second request link 111_2 to the second storage location 151 of each of the request registers 150 (namely, $RR^1\_2$, $RR^2\_2$, . . . , $RR^Q\_2$), and so on. Thus, each individual request link 111 is connected to multiple storage locations 151 (one per request register 150). In FIG. 6, for ease of illustration the request links 111 of an entire request section 210 are indicated collectively and individual request links 111 are not illustrated, but this should not be misunderstood to imply that there is just one request link per request section 210. However, in FIG. 7, the individual request links 111 connecting request circuits 110 to storage locations 151 in the request registers 150 are illustrated.

In certain examples, each individual request link 111 may comprise an interconnect portion 111A and a branching portion 111B. The interconnect portion 111A may connect to the corresponding request circuit 110 and span a region between the request circuits 110 and the request registers 150. The branching portion 111B maybe local to the request registers 150 and may include Q branches that each connects to one of the request registers 150. The request links 111 of the second example arbiter circuit 1000 may be similar to the request links 111 of the first example arbiter circuit 100 described above, except for the addition of the branching portion 111B to connect to the links 111 to the additional request registers 150.

In the second arbiter circuit 1000, each of the request circuits 110 is also connected to its corresponding grant register 160 via one of the read links 162, such that each request circuit 110 can read the values stored in its corresponding grant register 160. The read links 162 of the second example arbiter circuit 1000 may be similar to the read links 162 of the first example arbiter circuit 100 described above, except that in the arbiter circuit 1000 each set of read links 162 may connect their corresponding grant register 160 to just the request circuits 110 of the corresponding request section 210 rather than to all of the request circuits 110.

In response to an arbitration request Arb_Req, one of the request circuits 110 of the second arbiter circuit 1000 may write, via its corresponding request link 111, a connection request Req to the corresponding storage location 151 of each of the request registers 150. For example, RC_5 would write a arbitration request Arb_Req_5 via link 111_5 to each of $RR^1\_5, RR^2\_5, \ldots, RR^Q\_5$. The connection requests Req may each include an encoded identifier TargID of a connection target.

The request circuits 110 may determine when a requested connection has been granted by the grant circuits 120 by monitoring its corresponding grant register 160. Specifically, a given request circuit 110 may determine that its request has been granted when an identifier (SrcID) corresponding to the given request circuit 110 is written into its corresponding grant register 160 (the identifier SrcID is also written to the other grant registers 160, but this is irrelevant to the given request circuit 110). The given request circuit 110 may identify which egress port the granted connection is for based on the storage location 161 within the grant register 160 in which the SrcID was written. When a connection has been granted, the request circuit 100 that made the request and detected the grant may generate a connection granted message Arb_Gnt to notify the ingress port and a controller of the crossbar of the granted connection. The connection granted message Arb_Gnt may contain, among other things, an identifier of the egress port the granted connection is for. The request circuit 110 may also control a duration of a granted connection by indicating to the grant circuits 120 when a connection is to end.

Figure 8:
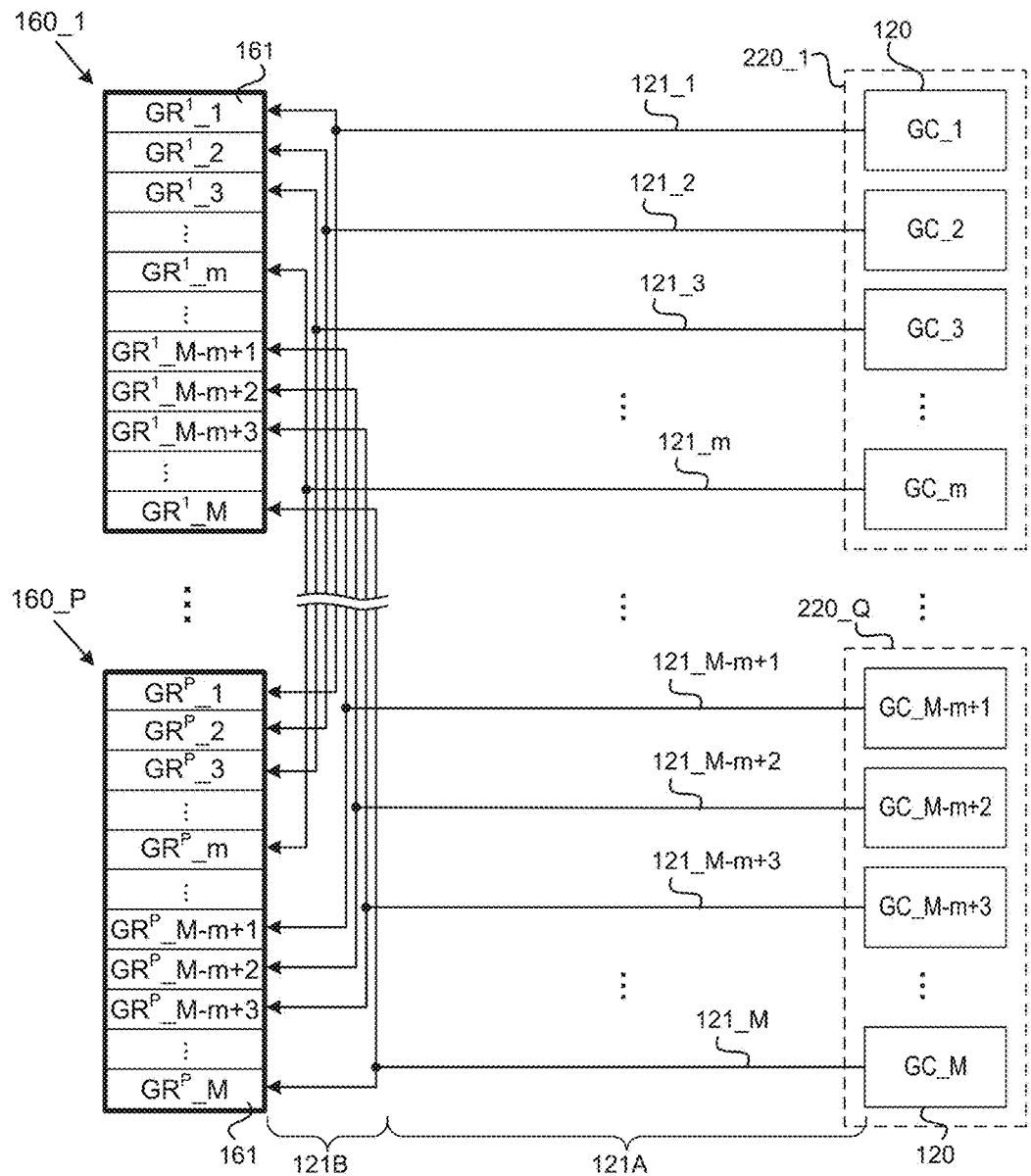
FIG. 8 illustrates example connections between grant circuits and grant registers of an example arbiter circuit.

In the second arbiter circuit 1000, each of the grant circuits 120 is connected to a corresponding storage location 161 in each of the grant registers 160 via a grant link 121. For example, as illustrated in FIG. 8, the first grant circuit 120 (GC_1) is connected via a first grant link 121_1 to the first storage location 161 of each of the grant registers 160_1 through 160_P (namely, $GR^1\_1, GR^2\_1, \ldots, GR^P\_1$), the second grant circuit 120 (GC_2) is connected via a second grant link 121_2 to the second storage location 161 of each of the grant registers 160 (namely, $GR^1\_2, GR^2\_2, \ldots, GR^P\_2$), and so on. Thus, each individual grant link 121 is connected to multiple storage locations 161 (one per request register 160). In FIG. 6, for ease of illustration the grant links 121 of an entire grant section 220 are indicated collectively and individual grant links 121 are not illustrated, but this should not be misunderstood to imply that there is just one grant link 120 per grant section 220. However, in FIG. 8, the individual grant links 121 connecting grant circuits 120 to storage locations 161 in the grant registers 160 are illustrated.

In certain examples, each individual grant links 121 may comprise an interconnect portion 121A and a branching portion 121B. The interconnect portion 121A may connect to the corresponding grant circuit 120 and span a region between the grant circuits 120 and the grant registers 160. The branching portion 121B maybe local to the grant registers 160 and may include P branches that each connects to one of the grant registers 160. The grant links 121 of the second example arbiter circuit 1000 may be similar to the grant links 121 of the first example arbiter circuit 100 described above, except for the addition of the branching portion 121B to connect to the links 121 to the additional grant registers 160.

As illustrated in FIG. 6, in the second arbiter circuit 1000, each of the grant circuits 120 is also connected to its corresponding request register 150 via a read link 152, such that each grant circuit 120 can read the values stored in its corresponding request register 150. The read links 152 of the second example arbiter circuit 1000 may be similar to the read links 152 of the first example arbiter circuit 100 described above, except that in the arbiter circuit 1000 each set of read links 152 may connect their corresponding request register 150 to just the grant circuits 120 of the corresponding grant section 220 rather than to all of the grant circuits 120.

The grant circuits 120 may monitor their corresponding request registers 150 to identify connection requests Req that are relevant to the respective grant circuits 120. A given grant circuit 120 may identify a connection request Req as being relevant to it when an identifier (TargID) of the request Req (which is written into its corresponding request register 150) matches the identifier of a target that is associated with the grant circuit 120. The target may be, for example, an individual egress port, a group of egress ports, a destination node, etc. A given grant circuit 120 may identify the request circuit 110 that is associated with a given connection request Req based on the location 151 within its corresponding request register 150 at which the given connection request Req is written. The grant circuits 120 may arbitrate between any conflicting connection requests based on arbitration rules, and a given grant circuit 120 may select an ingress port that is to be granted a connection to the egress port corresponding to the given grant circuit 120. The grant circuit 120 may grant the connection request by writing via one of the grant links 121 a grant message (Gnt) to the corresponding storage location 161 of each of the grant registers 160_1 through 160_P. For example, GC_3 would write a grant message Gnt_3 via link 111_3 to each of $GR^1\_3, GR^2\_3, \ldots, GR^Q\_3$. The grant message Gnt may include an identifier (SrcID) of the request circuit 110 whose connection request is being granted.

In the second example arbiter circuit 1000, the amount of wiring may be increased as compared to the first example arbiter circuit 100. In particular, because each request link 111 and each grant link 121 in the second arbiter circuit 1000 is connected to multiple request registers 150 and multiple grant registers 160, respectively (rather than one request register 150 and one grant register 150), the amount of wiring needed may be greater. In other words, the second example arbiter circuit 1000 may include the branching portions 111B and 121B of the request links 111 and grant links 121, while the first arbiter circuit 100 may not. However, this additional wiring does not significantly increase the cost of the second arbiter circuit 1000 relative to the first arbiter circuit 100. In particular, the additional wiring in the second arbiter circuit 1000—namely the wiring of the branching portions 111B and 121B—are local wirings, which are very short in comparison to the interconnect portions 111A and 121A. It is possible to efficiently implement circuit 1000 by implementing the interconnect portions 111A and 121A in higher layer metal and interconnect portions 111B and 121B in lower layer metal. Thus, the additional wiring length in the second arbiter circuit 1000 is just a small fraction of the overall wiring length. In addition, it is noted that the branching portions 111B and 121B of the links 111 and 121 are not considered herein to be additional interconnect signal lines, since they are local wiring lines, and hence are not counted in the analysis of the number of interconnect signal lines presented above.

In addition, in the second example arbiter circuit 1000, the wiring of the read links 152 and 162 is divided into Q and P groups, respectively, which may be easier to implement than a single group of read links 152 and a single group of read links 162. Specifically, the read links 152 and 162 in each group may need to fit within a range defined by a wire delay limit, and it may be easier to satisfy this constraint using multiple smaller groups as opposed to a single large group.

Both the first arbiter circuit 100 and the arbiter circuit 1000 are significantly less expensive to manufacture than an arbiter circuit of the first alternative approach with similar port counts. In particular, the numbers of interconnect signal wires in the first arbiter circuit 100 and the second arbiter circuit 1000 are much less than the number of interconnect signal wires in an arbiter circuit of the first alternative approach. Because the cost per interconnect signal wire is significant, this reduction in the number of interconnect signal wires results in a significant cost reduction.

In addition, the first arbiter circuit 100 and the arbiter circuit 1000 have better performance attributes than a hierarchical arbiter with similar port counts. In particular, the first arbiter circuit 100 and the arbiter circuit 1000 may both be flat arbiters, which do not suffer from the performance problems associated with hierarchical arbiters described above.

In both the first arbiter circuit 100 and the second arbiter circuit 1000, each of the request links 111 may be an A bit link, where A is an integer greater than 1. In some examples, the number A of bits per request link 111 may be based on how many bits are needed to uniquely encode identifiers of the connection targets, plus any extra bits desired for other functions, such as a bit to indicate a desired duration of a granted connection. In examples in which the connection targets are specified by the request circuits 110 at a port-level granularity, the number A of bits per request link 111 may be equal to or greater than $\log_2(M)$. In some examples, a zero binary value (00 . . . 0) may be reserved as a default value and not used as an identifier of a target.

In both the first arbiter circuit 100 and the second arbiter circuit 1000, any numbers of request circuits 110 and grant circuits 120 may be used (i.e., N and M are both any integer greater than 1). In some examples, more grant circuits 120 are included than request circuits 100 (i.e., M>N), but this need not necessarily be the case.

[Example Method of Arbitrating a Crossbar]

FIG. 9 illustrates an example method of arbitrating for a crossbar. The example method of FIG. 9 may be performed, for example, by way of an arbiter circuit of the crossbar, such as the example arbiter circuits 100 and 1000.

In block 901, the method includes causing request circuits (for example of an arbiter circuit), which correspond respectively to ingress ports of the crossbar, to request connections by writing connection requests to a request register (for example of the arbiter circuit), the connection requests each comprising an encoded identifier of a connection target ("target identifier"). For example, the request circuits may be caused to write their connection requests to specific storage locations in the request register that correspond, respectively, to the request circuits.

In block 902, the method includes causing grant circuits (for example of the arbiter circuit), which correspond respectively to egress ports of the crossbar, to identify which of the connection requests are relevant to which of the grant circuits based on the target identifiers stored in the request register. For example, this may include causing each of the grant circuits to compare the target identifiers stored in the request register to an identifier associated with the respective grant circuit, and identifying as relevant those connection requests for which the comparison yields a match.

In block 903, the method includes causing each of the grant circuits to determine whether to grant any of the connection requests that are relevant to the respective grant circuit. For example, this may include causing each of the grant circuits to apply arbitration rules to their relevant connection requests.

In block 904, the method includes causing the grant circuits to grant connections by writing grant messages to a grant register (for example, of the arbiter circuit), the grant messages each comprising an encoded identifier associated with the request circuit whose connection request is being granted (source identifier). For example, this may include causing each of the grant circuits to, for each connection request the respective grant circuit grants, determine the source identifier to be written to the grant register based on the location within the request register at which the target identifier of the respective connection request is written.

In block 905, the method includes causing the request circuits to identify which of the request circuits have had their requested connections granted based on the source identifiers stored in the grant register. This may include causing each of the request circuits to, for each of its connection requests that have been granted, identify the grant circuit that granted the respective connection request based on the location within the grant register at which is written the source identifier that indicated that the respective connection request had been granted.

In block 906, the method includes causing the crossbar to establish connections based on the granted connection requests. For example, this may include causing the request circuits to notify the crossbar of the granted connection request.

The method may also include causing the request circuits to indicate an end of a given connection with a given target by writing a value to the request register. This may include, for example, writing the value to an end-of-request bit of a storage location of the request register.

As used herein, to "provide" an item means to have possession of and/or control over the item. This may include, for example, forming (or assembly) some or all of the item from its constituent materials and/or, obtaining possession of and/or control over an already-formed item.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of active optical devices, wherein the active optical devices . . . " could encompass both one active optical device and multiple active optical devices, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form and subsequent references to the item may include the definite pronoun "the" for grammatical consistency, but this does not necessarily mean that only one item is being referred to. Thus, for example, a phrase such as "an optical socket, wherein the optical socket . . . " could encompass both one optical socket and multiple optical sockets, notwithstanding the use of the singular form and the definite pronoun.

Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently (i.e., in parallel).

While the above disclosure has been shown and described with reference to the foregoing examples, it should be understood that other forms, details, and implementations may be made without departing from the spirit and scope of this disclosure.

What is claimed is:

1. An arbiter circuit for a crossbar, comprising:
request circuits corresponding respectively to ingress ports of the crossbar;
grant circuits corresponding respectively to egress ports of the crossbar;
a request register; and
a grant register,
wherein each of the request circuits is to request a connection between its corresponding ingress port and a target by writing a connection request comprising an encoded identifier of the target to the request register, and
each of the grant circuits is to grant a connection between its corresponding egress port and one of the ingress ports by writing an encoded identifier of the request circuit that corresponds to the ingress port to the grant register.

2. The arbiter circuit of claim 1,
wherein each of the grant circuits is to:
determine whether any of the connection requests are relevant to the respective grant circuit based on the encoded identifiers of the targets stored in the request register, and
for each of the connection requests that is relevant to the respective grant circuit, determine whether to grant the respective connection request.

3. The arbiter circuit of claim 2,
wherein each of the grant circuits is to, for each connection request it grants, determine the encoded identifier of the request circuit to be written to the grant register based on the location within the request register at which the encoded identifier of the target of the respective connection request is written.

4. The arbiter circuit of claim 1,
wherein each of the request circuits is to determine whether any of its connection requests have been granted based on the encoded identifiers of the request circuits stored in the grant register.

5. The arbiter circuit of claim 4,
wherein each of the request circuits is to, for each of its connection requests that have been granted, identify the grant circuit that granted the respective connection request based on the location within the grant register at which is written the encoded identifier of the request circuit that indicated that the respective connection request had been grant.

6. The arbiter circuit of claim 1,
wherein the request circuits are to write to the request register via respectively corresponding links; and
each of the links includes:
a number of identifier bit lines by which the encoded identifiers of the targets are written from the corresponding request circuit to the request register; and
an end-of-request bit line by which the corresponding request circuit is to indicate an end of a given connection with a given target.

7. The arbiter circuit of claim 1,
wherein the targets include port groups that each comprises one or more of the egress ports and the encoded identifiers of the targets include identifiers of the port groups.

8. The arbiter circuit of claim 7, further comprising:
group control circuitry that is to variably set which of the egress ports are included in which of the port groups.

9. The arbiter circuit of claim 1,
wherein the targets include individual ones of the egress ports, and the encoded identifiers of the targets include identifiers of individual ones of the egress ports.

10. An arbiter circuit for a crossbar, comprising:
request circuits corresponding respectively to ingress ports of the crossbar, the request circuits being arranged in multiple request sections;
grant circuits corresponding respectively to egress ports of the crossbar, arranged in multiple grant sections;
multiple request registers, one for each of the grant sections; and
multiple grant registers, one for each of the request sections;
wherein each of the request circuits is to request a connection between its corresponding ingress port and a target by writing a connection request comprising an encoded identifier of the target to each of the request registers, and each of the grant circuits is to grant a connection between its corresponding egress port and one of the ingress ports by writing an encoded identifier of the request circuit that corresponds to the ingress port to each of the grant registers.

11. The arbiter circuit of claim 10,
wherein each of the grant circuits is to:
monitor the request register associated with the grant section that includes the respective grant circuit and determine whether any of the connection requests are relevant to the respective grant circuit based on the encoded identifiers of the targets stored in the request register, and
for each of the connection requests that is relevant to the respective grant circuit, determine whether to grant the respective connection request.

12. The arbiter circuit of claim 10,
wherein each of the request circuits is to monitor the grant register associated with the request section that includes the respective request circuit, and determine whether any of the respective request circuit's connection requests have been granted based on the encoded identifiers of the request circuits stored in the grant register.

13. The arbiter circuit of claim 10,
wherein the targets include port groups that each comprises one or more of the egress ports and the encoded identifiers of the targets include identifiers of the port groups.

14. The arbiter circuit of claim 13, further comprising:
group control circuitry that is to variably set which of the egress ports are included in which of the port groups.

15. The arbiter circuit of claim 10,
wherein the targets include individual ones of the egress ports, and the encoded identifiers of the targets include identifiers of individual ones of the egress ports.

16. The arbiter circuit of claim 10,
wherein the request circuits are to write to the request register via respectively corresponding links; and
each of the links includes:
a number of identifier bit lines by which the encoded identifiers are written from the corresponding request circuit to one of the request registers; and
an end-of-request bit line by which the corresponding request circuit is to indicate an end of a given connection with a given target.

17. A method of arbitrating a crossbar, the method comprising:
causing request circuits, which correspond respectively to ingress ports of the crossbar, to request connections by writing connection requests to a request register, the connection requests each comprising an encoded identifier of a connection target;
causing grant circuits, which correspond respectively to egress ports of the crossbar, to identify which of the connection requests are relevant to which of the grant circuits based on the encoded identifiers of the connection targets stored in the request register;
causing each of the grant circuits to determine whether to grant any of the connection requests that are relevant to the respective grant circuit;
causing the grant circuits to grant connection requests by writing grant messages to a grant register, the grant messages each comprising an encoded identifier associated with the request circuit whose connection request is being granted;
causing the request circuits to identify which of the request circuits have had their connection request granted based on the encoded identifiers associated with the request circuits stored in the grant register; and
causing the crossbar to establish connections based on the granted connection requests.

18. The method of claim 17, further comprising:
causing each of the grant circuits to, for each connection request the respective grant circuit grants, determine the encoded identifier associated with the request circuit to be written to the grant register based on the location within the request register at which the encoded identifier of the connection target of the respective connection request is written.

19. The method of claim 17, further comprising:
causing each of the request circuits to, for each of its connection requests that have been granted, identify the grant circuit that granted the respective connection request based on the location within the grant register at which is written the encoded identifier associated with the request circuit that indicated that the respective connection request had been granted.

20. The method of claim 17, further comprising:
causing the request circuits to indicate an end of a given connection with a given target by writing a value to the request register.

* * * * *